Feb. 7, 1956 H. V. TÖRNEBOHM 2,733,516
TOLERANCE LIMIT GAGE
Filed Jan. 21, 1952 2 Sheets-Sheet 1
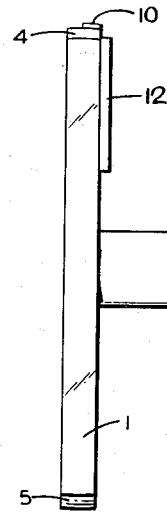
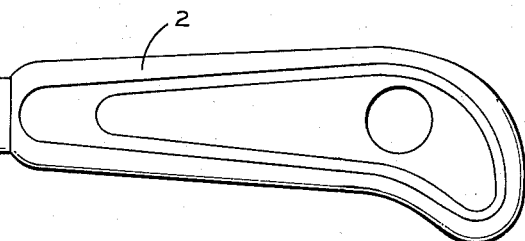
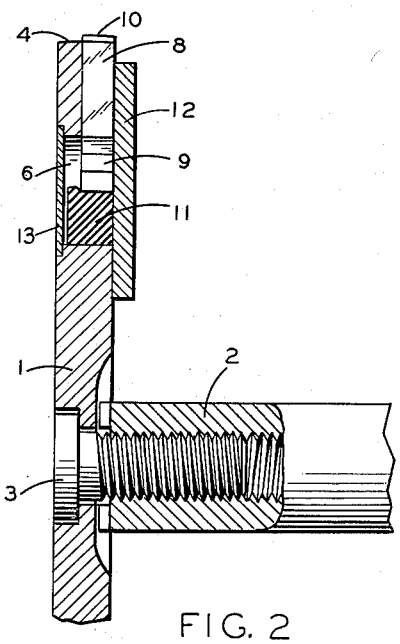
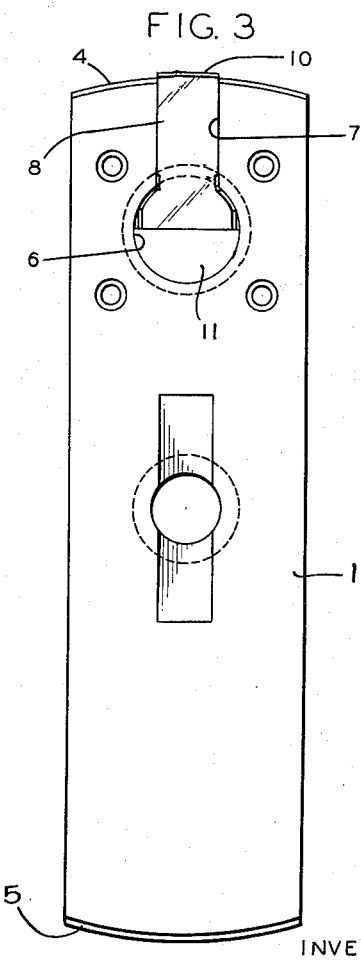
FIG. 1
FIG. 2
FIG. 3
INVENTOR:
HILDING VALDEMAR TÖRNEBOHM
BY HIS ATTORNEYS
Howson & Howson Feb. 7, 1956   H. V. TÖRNEBOHM   2,733,516
TOLERANCE LIMIT GAGE Filed Jan. 21, 1952   2 Sheets-Sheet 2

INVENTOR:
HILDING VALDEMAR TÖRNEBOHM
BY HIS ATTORNEYS
Howson & Howson

United States Patent Office 2,733,516
Patented Feb. 7, 1956

2,733,516
TOLERANCE LIMIT GAGE

Hilding Valdemar Törnebohm, Goteborg, Sweden, assignor, by mesne assignments, to SKF Industries, Inc., Philadelphia, Pa., a corporation of Delaware Application January 21, 1952, Serial No. 267,325

Claims priority, application Sweden January 26, 1951

6 Claims. (Cl. 33—178)

Gages having a gage body shaped as the zone of a sphere for checking the minimum dimension of a bore and having a projection located thereon for checking the maximum dimension, have been found very suitable, especially for checking the bores of through holes, since both the maximum and minimum dimensions can be checked in a single operation merely by tilting the gage body after it has been introduced into the bore. Gages of this type further fill the requirement that the minimum dimension shall be checked by means of a gage body conforming to a greater part of the circumference of the bore than does the part for checking the maximum dimension. It has, however, the disadvantage, when used for checking blind holes or holes having shoulders, that it cannot check that part of the bore adjacent to the shoulder or to the bottom of the hole, since it must be made of comparatively great thickness and the active portions of the gaging surfaces therefore cannot be applied near the bottom of the hole. These gages are also comparatively heavy when made for checking large bores.

The present invention relates to a tolerance limit gage or the like having a gage body provided with one or more gaging surfaces for gaging the go-side and a member having a surface for gaging the tolerance limit on the not go-side and is characterized mainly in that the latter member is freely elastically movable relative to the gage body and so disposed relative the latter that the maximum surface and minimum surface can be brought into gaging position merely by tilting of the gage body.

Figure 4:
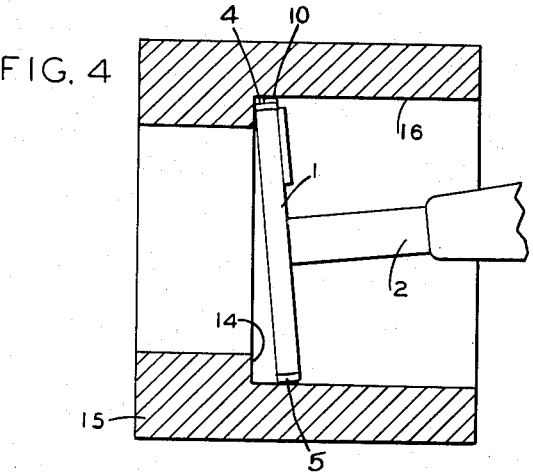
Figure 5:
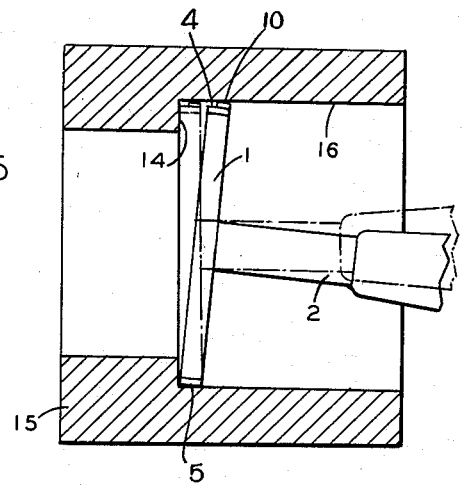

The invention is illustrated in the accompanying drawings in which Fig. 1 shows a side view of a bore gage. Fig. 2 shows on a larger scale a section of a portion of the gage body. Fig. 3 shows an end view of the gage body with cover plate removed. Fig. 4 shows the position of the gage in a bore having a shoulder at the beginning of a gaging operation near the shoulder. Fig. 5 shows an intermediate position and the final position during the same gaging operation.

The gage according to Fig. 1 comprises a gage body 1 fixed to a handle 2 by means of a screw 3 (Fig. 2). The gage body has the shape of a flat bar of rectangular section, the end surfaces 4 and 5 of which form parts of a spherical surface for gaging the tolerance limit on the go-side. A hole 6 is provided in the gage body, the surface of the hole being finished with great accuracy, for instance by a lapping operation. A groove 7 is provided extending from the hole 6 to the surface 4 to form a guide for the straight portion of a finger 8, the inner end of which is provided with a spherical or cylindrical surface 9, which is made with great accuracy and which preferably has the same radius as the hole 6. The gaging member is further provided with a surface 10, which is preferably, but not necessarily, spherical for gaging the tolerance limit on the not go-side. The distance between this surface and surface 9 is chosen so that the surface 10 will extend beyond the surface 4 an amount corresponding to the tolerance zone, when the surface 9 is in contact with the wall of the hole 6. The finger 8 is normally held in this position by a block 11 of rubber, which is more or less semi-cylindrical in shape and which fits the hole 6. The finger 8 is retained in the groove 7 by a cover plate 12, which is screwed to the gage body and covers the groove and the hole. The thickness of the finger is slightly less than the depth of the groove and it can thus be displaced axially in the groove against the pressure of the rubber block. The other side of the hole is covered by a cover 13, which is glued or fixed to the body of the gage in some other suitable manner.

The progress of a gaging operation adjacent to a shoulder 14 in a work-piece 15, having a bore the wall of which is designated 16, is illustrated in Figures 4 and 5. In this case the diameter of the bore is assumed to be within the prescribed limits. The gage is inserted into the bore in a somewhat oblique position, as shown in Fig. 4, so that the body of the gage can be freely displaced in the bore. When the gage has assumed the position required for the gaging operation, it is tipped about an axis, which is perpendicular to the axis of the handle and to that of the gage body, as will be apparent from a comparison of Figures 4 and 5. One way of doing this is to release the handle of the gage so that the gage is tilted by its own weight. If the gage body cannot be tilted entirely over, the hole is too small. If it can be tilted without resistance, the bore is too large. If, on the other hand, the bore is within the prescribed limits, the finger 8 engages the wall 16 of the bore, which can be plainly felt, but the gage can be tilted entirely past the central position, since the pressure from the wall of the bore forces the finger 8 backwards in the groove, compressing the rubber block sufficiently to permit the finger to pass the central position. With sufficient practice it is possible by feeling the resistance to judge approximately where within the tolerance zone the diameter of the bore is located. A light contact means of course, that the diameter is closer to the limit on the not go-side and harder contact that it is closer to the limit on the go-side.

Since the finger can be forced aside, it is possible to locate it near the central plane of the gage body and also to make the gage body thin, whereby the gage can be used for gaging close to a shoulder or close to the bottom of a blind hole.

The finger can be movably fixed to the gage body in other ways than that shown. Thus it can be connected to the gage body by a hinge or the like which permits it to be tilted backwards relative the gage body, so that it will yield when the gage is tilted. In this case it is preferable to provide a spring, which returns the finger to its normal position. In the form illustrated the rubber block may be replaced by some other suitable resilient member. The device can of course also be used on gages of other types for instance on pin gages and snap gages.

I claim:

1. In a tolerance limit gage having a gage body with one or more gaging surfaces for gaging the tolerance limit on the go-side and a movable gaging member having a separate surface for gaging the tolerance limit on the not go-side and wherein the said surfaces for both sides can be brought into gaging position by tilting the gage body, the improvement which consists in the provision of resilient means for normally maintaining the gaging surface of said member in a normal operative position extended with respect to the said go-side gaging surface and for affording retractive movements of said member by pressure engagement of the gaging surface thereof with the work when the gage body is tilted in the gaging operation.

2. Tolerance limit gage according to claim 1 wherein the said gaging member is movable in and is guided by a radial groove in the body of the gage.

3. A tolerance limit gage according to claim 2 wherein the said gaging member is supported by a resilient member such as a block of rubber or the like.

4. Tolerance limit gage according to claim 1 wherein the gaging surface of the said member closely adjoins a go-side gaging surface so that the two surfaces may be brought successively into gaging position by tilting the gage body through a small angle.

5. In a tolerance limit gage, a gage body comprising a body member having one or more gaging surfaces for gaging the tolerance limit on the go-side and a gaging member having a separate surface for gaging the tolerance limit on the not go-side and wherein the said surfaces for both sides can be brought into gaging position by a continuous tilting movement of the gage body, said body member having in one face thereof a recess defining an edge of a go-side gaging surface in which recess the said gaging member is slidably mounted so that said go-side surface and the gaging surface of the member lie in contiguous relation, resilient means for normally maintaining the gaging surface of said member in a normal operative position extended with respect to the contiguous go-side gaging surface and for affording retractive movements of said member by pressure engagement of the gaging surface thereof with the work when the gage body is tilted in the gaging operation, said gage member and the contiguous portion of the body member being each relatively thin and with the said recessed mounting of said member affording a gage body of minimum thickness.

6. A tolerance limit gage according to claim 5 wherein the gage body is provided with a transverse aperture communicating with the bottom of said recess and of greater transverse dimension than the latter, said gaging member having at its inner end a transversely extended portion seating against the wall of said aperture at opposite sides of the recess and determining the said normal extended operative position of the gaging surface of said member, and said resilient means comprising a resilient element confined between the end of said gaging member and the confronting wall of the aperture and exerting resilient pressure tending to maintain the said member in the extended position.

References Cited in the file of this patent

UNITED STATES PATENTS

| | | |
|---|---|---|
| 1,636,543 | Aldeborgh | July 19, 1927 |
| 1,793,763 | Tornebohm | Feb. 24, 1931 |
| 2,493,233 | Dower | Jan. 3, 1950 |
| 2,514,956 | Kuebler | July 11, 1950 |

FOREIGN PATENTS

| | | |
|---|---|---|
| 535,675 | Great Britain | Apr. 17, 1941 |
| 586,652 | Great Britain | Mar. 26, 1947 |
| 608,171 | Great Britain | Sept. 10, 1948 |